United States Patent

[11] 3,567,853

| [72] | Inventor | Leonard E. Green<br>Dundalk, Md. |
|---|---|---|
| [21] | Appl. No. | 802,834 |
| [22] | Filed | Feb. 27, 1969 |
| [45] | Patented | Mar. 2, 1971 |
| [73] | Assignee | Bethlehem Steel Corporation |

[54] TELEVISION POSITION INDICATING APPARATUS
3 Claims, 4 Drawing Figs.

[52] U.S. Cl. .................................................. 178/6.8
[51] Int. Cl. .................................................. H04n 7/18
[50] Field of Search .......................................... 178/6
(IND), 6.5, 6.8; 356/1, 4, 5, 152

[56] References Cited
UNITED STATES PATENTS

| 2,073,370 | 3/1937 | Goldsmith | 178/6F&M |
| 2,412,279 | 12/1946 | Miller | 178/6F&M |
| 2,417,446 | 3/1947 | Reynolds | 178/6.5 |
| 2,786,096 | 3/1957 | Palmer | 178/6.8 |
| 3,052,754 | 9/1962 | Williams | 178/6.5 |

Primary Examiner—Robert L. Griffin
Assistant Examiner—Joseph A. Orsino, Jr.
Attorney—Joseph J. O'Keefe ABSTRACT: Closed circuit TV indicates the alignment position of a coil lifter on a remotely controlled subway car with the vertical center of a coil of metal strip located randomly along skids on a floor above the car. Two vidicon TV cameras, one modified for opposite-hand horizontal scanning, are attached to a remotely controlled azimuthal aiming mount and imaged from opposite side of an aiming axis which extends perpendicular to car movement. This produces two opposite-hand video signals of adjacent views of the same field. The video signals are continuously mixed and fed to a TV monitor where full opposite-hand images are observed in superposed relationship. Two horizontally displaced images of the coil, or an illuminated target carried by the subway car at the lifter, converge toward one another during movement of the aiming mount or the car, whereby said alignment is indicated by maximum convergence of their TV images.

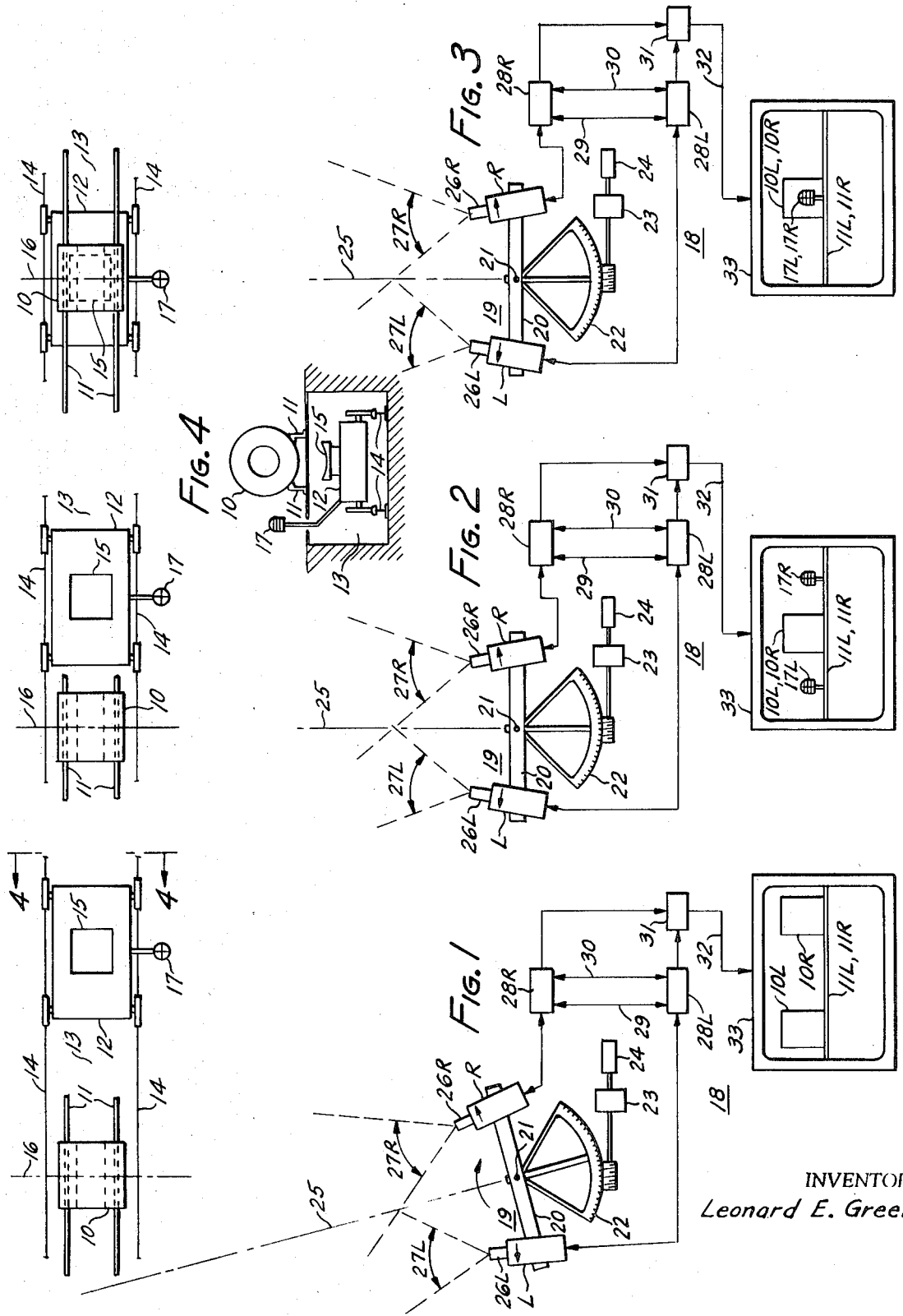

3,567,853

TELEVISION POSITION INDICATING APPARATUS

BACKGROUND OF THE INVENTION

This invention relates broadly to closed circuit television systems. More particularly, it relates to television position indicating apparatus for facilitating alignment of a coil lifter on a remotely controlled subway car with an overhead coil of metal strip awaiting delivery to a coil processing line.

In some types of metal strip processing lines, such as trimming and shearing line, or a temper rolling line, and the like, banded coils of metal strip are transferred from storage and placed at random locations along floor level skids to await delivery to a coil processor. The skids extend outward perpendicularly from the feed end of the coil processing line as does a coil car running in a subway under the skids. The coil car has a coil lifter for raising the coil clear of the skids. Both the coil car and lifter operate under remote control. A distant operator initiates coil pickup and delivery to the feed end of a coil processor, but automatic indexing controls take over and precisely centralizes the coil in said processor. Hence, a problem arises as to exactly where the operator should position the coil car and lifter relative a randomly located coil so as to maintain the precise indexing and centralizing of the coil at the feed end of the coil processor.

SUMMARY OF THE INVENTION

One of the objects of this invention is to provide television position indicating apparatus to facilitate remote alignment of the coil car and lifter with the vertical center of coils placed at random locations along the coil skids.

Another object of this invention is to provide said television apparatus with remotely controlled TV camera mounting means to facilitate remote selection of a coil at any location on said skids for alignment with the coil car and lifter.

Other and further objects of this invention will become apparent during the course of the following description and by reference to the accompanying drawing and appended claims.

The foregoing objects can be obtained with closed circuit TV apparatus comprising two standard vidicon TV cameras assembled to a remotely controlled azimuthal aiming mount, the mount being located a fixed distance from, and perpendicular to, the line of car movement and the coil skids. The cameras are imaged from opposite sides of an aiming axis and modified for scanning horizontally in opposition to each other, thereby producing two opposite-hand video signals of adjacent views of the same field. The video signals are continuously mixed and fed to a TV monitor where full opposite-hand images are observed in superimposed relationship. When the aiming mount is swung with the aiming axis traveling toward a preselected coil, or when the coil car is moved toward the aiming axis when fixed on a coil, two horizontally displaced full images of the coil, or the coil car, are viewed converging toward one another, whereby alignment of the coil car with the preselected coil is indicated by maximum convergence of their images on the TV monitor.

DESCRIPTION OF THE DRAWINGS

FIGS. 1, 2 and 3 are diagrammatical plan views of the entire coil, coil car and TV camera mount installation combined with a block diagram of the television position indicating apparatus. FIG. 1 shows the TV cameras and aiming mount misaligned with a coil. FIG. 2 shows the TV cameras and aiming mount fixedly aligned with a preselected coil and the coil car moving toward the aiming axis. FIG. 3 shows the coil car aligned with the vertical center of the preselected coil. FIG. 4 is a lateral cross-sectional view taken along line 4—4 of FIG. 1.

DESCRIPTION OF THE PREFERRED EMBODIMENT

Referring to the drawing, the television position indicating apparatus of this invention is illustrated diagrammatically in reference to a contemporary metal strip processing line, although it can be used to make remote observations in other applications. In such processing lines, a plurality of banded coils of metal strip 10 are transferred from storage and placed at random locations along floor level rail skids 11. Although a plurality of coils 10 are accommodated by skids 11, only one such coil is shown in the drawing for the sake of simplicity. Skids 11 are of a predetermined length and are spaced perpendicularly from the feed end of a coil processor (not shown) at the beginning of the coil processing line (not shown).

Coils 10 are delivered to the feed end of said processor by powered coil carrying car 12. Car 12 travels in subway 13 along rails 14 which are located directly beneath, and parallel to, skids 11. Car 12 is equipped with a powered coil lifter 15 which, together with car 12, are operated under remote control by a distant operator who generally has additional duties to perform. During operation, car 12 is first caused to move directly under coil 10 and stop with the center of lifter 15 at vertical plane 16 which is equidistant from the sides of coil 10. Then, lifter 15 is raised to the point where it lifts coil 10 clear of skids 11. Finally, car 12 is caused to be moved into the coil processor and stopped automatically at a point where coil 10 is centralized in the processor feed end equipment. At the end of this event, lifter 15 is lowered and car 12 is ready to move out to the next coil 10.

Rather precise indexing mechanisms (not shown) are employed to automatically stop car 12 and centralize coil 10 as noted above. Such precise indexing is to be maintained regardless of the random distance coil 10 is placed from the coil processor. However, because of visual obstructions produced by coils 10 and skids 11, coupled with the fact that car 12 travels in subway 13, it is very difficult if not impossible to see more than the top of lifter 15 from floor level and to observe exactly where to stop car 12 at a vertical plane 16 of any preselected coil 10. Consequently, to facilitate instant observation of car 12 from floor level, illuminated target 17 is provided secured to the near side of car 12 in alignment with the vertical centerline of lifter 15. Target 17 is installed extended above floor level in such manner as to clear all obstacles along the pathway of car 12 movement.

To facilitate remote observation of car 12 movement and its alignment with coil 10 while the latter is resting on skids 11, television (TV) position indicating apparatus 18 is installed with TV cameras slightly above floor level. This provides the distant operator with a remote side elevational view of coil 10 and target 17. Television position indicating apparatus 18 comprises two commercially available vidicon type of TV cameras L and R, the like designations of which will be postfixed to reference numerals of associated components and images yet to be described. An example of a vidicon type of TV camera well suited for the present invention is one manufactured by Diamond Power Specialty Co., Lancaster, Ohio, their Model No. ST-1. This particular model combines both camera and camera controls in a single housing and provides a video output signal suitable for use with an external monitor. Two additional outputs are normally provided by tapping the horizontal and vertical oscillators in the deflection circuits for use externally as described below. Other types of vidicon TV cameras may be used, including those where the camera and camera controls are in separate housings. The block diagrams on the drawing have been shown with the latter type of equipment in mind, mainly for ease of illustration rather than actual preference.

TV cameras, L, R are assembled to remotely controlled azimuthal aiming mount 19, specifically near opposite ends of horizontal support member 20. Member 20 is provided with centrally located upright journal 21 through which a vertical axis extends and about which said member 20 is pivotally supported by an upright member secured to the floor (not shown). Aiming mount 19 is also provided with arcuate gear segment 22 which is attached to horizontal support member 20 and reversibly driven by gear motor 23. The latter device is operative under control of reversing motor controller 24 which is located at the distant operator's station. This effectively provides for remote control of bidirectional azimuthal movement of aiming mount 19, said movement occurring about the vertical axis that extends through journal 21.

Reference to azimuthal movement of mount 19 is taken relative to aiming axis 25 which extends perpendicularly from both the horizontal support member 20 and the vertical axis through journal 21. TV cameras, L, R are imaged from opposite sides of aiming axis 25 after having their optical axes fixedly aligned to converge on a predetermined distant point, say in the central region of coil 10. Each TV camera L, R is fitted with an adjustable focus lens 26L, 26R, the settings of which are dependent upon a predetermined distance between aiming mount 19 and coils 10. These lenses should have a horizontal field of view 27L, 27R, respectively, sufficiently wide enough to capture the images of car 12 when alongside coil 10, similar to that shown in FIG. 2.

Under the foregoing conditions, TV cameras L, R will produce video signals of adjacent views of the same field, which signals are fed to camera control units 28L, 28R, respectively. If the TV cameras L, R are of the Model No. ST-1 variety noted above, then the tapped outputs of the horizontal and vertical oscillators are simply tied together by way of circuits 29 and 30, respectively, to achieve synchronous scanning operations in both cameras L, R. Otherwise, camera control units 28L, 28R must be modified by tapping both horizontal and vertical oscillator outputs and completing the circuits 29, 30, to effect synchronous scanning operations.

One other important modification to be made in TV camera L, or in camera control unit 28L, regardless of their manufacturer, is the reversing of the horizontal deflection leads so that the vidicon tube is scanned from right to left, rather than the conventional manner of from left to right. In so doing, TV cameras L, R scan horizontally in opposition to each other, thereby producing opposite-hand video output signals of adjacent views of the same field.

The video output signals from camera control units 28L, 28R are circuited to video mixer 31 where they are continuously combined. The resultant signal is fed over circuit 32 as a composite video signal to commercially available TV monitor 33 where full opposite-hand images of the field are observed in superimposed relationship.

OPERATION OF THE PREFERRED EMBODIMENT

Referring to FIG. 1, it is assumed that a previous coil of metal strip was located to the left of coil 10, thus establishing aiming axis 25 at some angle to vertical plane 16 and placing car 12 out of the fields of view 27L, 27R. Further, that coil 10 was placed on skids 11 at an ideal location, viz., where vertical plane 16 is aligned with the vertical axis extending through journal 21. In addition, that coils 10 are illuminated better than their surroundings regardless of their location along skids 11.

Under the foregoing conditions, the distant operator while viewing TV monitor 33 will observe two horizontally displaced images 10L, 10R of coil 10. This results from scanning the vidicon tubes in cameras L, R horizontally in opposition to each other, even though coil 10 is located to the right of the optical center of each camera. This condition is indicative of azimuthal misalignment of aiming mount 19 with a preselected coil 10.

To correct azimuthal misalignment, the distant operator activates motor controller 24, which in this case should cause clockwise movement of aiming mount 19. Such movement should continue until aiming axis 25 is aligned with coil 10 at its vertical plane 16, such as is illustrated in FIG. 2.

During movement of aiming mount 19, coil images 10L, 10R converge toward one another near the center of TV monitor 33. Under the ideal conditions stated above, these images will converge into one and indicate proper alignment of aiming mount 19 with coil 10 to establish a reference position as an aid in locating car 12 directly under coil 10. However, as is often the case, ideal conditions are not always met in practice. For example, the random location of coil 10 from the coil processor (not shown) may place the vertical plane 16 of coil 10 to either the right or the left of the vertical axis extending through journal 21. Under such conditions, the azimuthal movement of aiming mount 19 should be stopped when maximum convergence of images 10L, 10R occurs.

While aiming mount 19 is being swung between the positions illustrated in FIGS. 1 and 2, horizontally displaced images 17L and 17R of the illuminated target 17 carried at the near side center of car 12 will first appear at the respective left and right edges of TV monitor 33. Images 17L, 17R will converge toward one another until movement of aiming mount 19 is stopped at the alignment positions with coils 10 as noted above.

Movement of car 12 between the positions illustrated in FIGS. 2 and 3 may be followed by the distant operator by observing continued convergence of images 17L, 17R toward one another. Under the ideal condition stated above, these images will converge into one and indicate the proper lateral position where car 12 should be stopped for engaging the center of lifter 15 with coil 10 at vertical plane 16. Under less than ideal conditions, movement of car 12 should be stopped when maximum convergence of images 17L, 17R occurs. In either event, reversal of car 12 may take place after the distant operator observes on TV monitor 33 that lifter 15 has raised coil 10 clear of skids 11. Reversal of car 12 causes the unitary image 10L, 17L, 10R, 17R to diverge into two horizontally displaced images 10L, 17L and 10R, 17R. These images will ultimately disappear from the respective left and right edges of TV monitor when coil 10, car 12 combination moves out of the fields of view 27L, 27R.

I claim:
1. Television position indicating apparatus comprising:
 a. television camera means imaged from opposite sides of an aiming axis for producing first and second video signals representing adjacent views of the same field;
 b. camera scanning means having synchronized deflection circuitry modified for opposite hand horizontal scanning during the production of the first and second video signals, respectively;
 c. means for mixing the first and second video signals and producing a combined video output signal; and
 d. monitoring means receiving the combined video output signal for observing complete opposite hand images of the field in superimposed relation, whereby a field object displaced laterally relative the aiming axis appears as two horizontally displaced full objects which converge toward one full object as said lateral displacement diminishes.
2. The television apparatus of claim 1 wherein:
 e. means (a) consists of a pair of television cameras fixedly disposed on opposite sides of the aiming axis and aimed inwardly at a distant object; and
 f. means (b) includes separate horizontal deflection circuitry for simultaneous scanning of each camera horizontally in opposition.
3. The television apparatus of claim 1 including:
 g. means for rotating means (a) about a vertical axis extending through the aiming axis.